(No Model.)

J. A. LUKE.
VEHICLE SPRING.

No. 504,043. Patented Aug. 29, 1893.

Witnesses
John Toririe
John E. Robertson

Inventor
James A Luke
By T. J. W. Robertson
Attorney

UNITED STATES PATENT OFFICE.

JAMES A. LUKE, OF PETROLIA, CANADA, ASSIGNOR TO BENJAMIN S. VAN TUYL, OF SAME PLACE.

VEHICLE-SPRING.

SPECIFICATION forming part of Letters Patent No. 504,043, dated August 29, 1893.

Application filed May 6, 1893. Serial No. 473,284. (No model.)

*To all whom it may concern:*

Be it known that I, JAMES ALEXANDER LUKE, a subject of the Queen of Great Britain, residing at Petrolia, in the county of Lambton, in the Province of Ontario, Canada, have invented certain new and useful Improvements in Vehicle-Springs, of which the following is a specification, reference being had therein to the accompanying drawings.

This improvement relates to that class of vehicles wherein the body or seat is connected to a spring which is supported by a fulcrum adapted to be changed to suit the load carried; and the invention consists in the peculiar construction, arrangement and combinations of parts hereinafter more particularly described and then definitely claimed.

Figure 1:
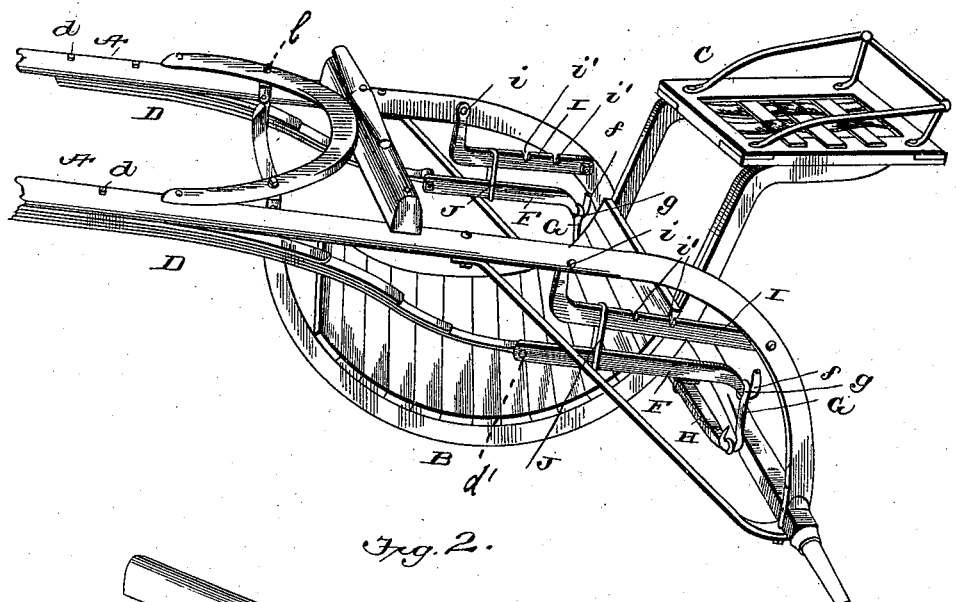
Figure 2:
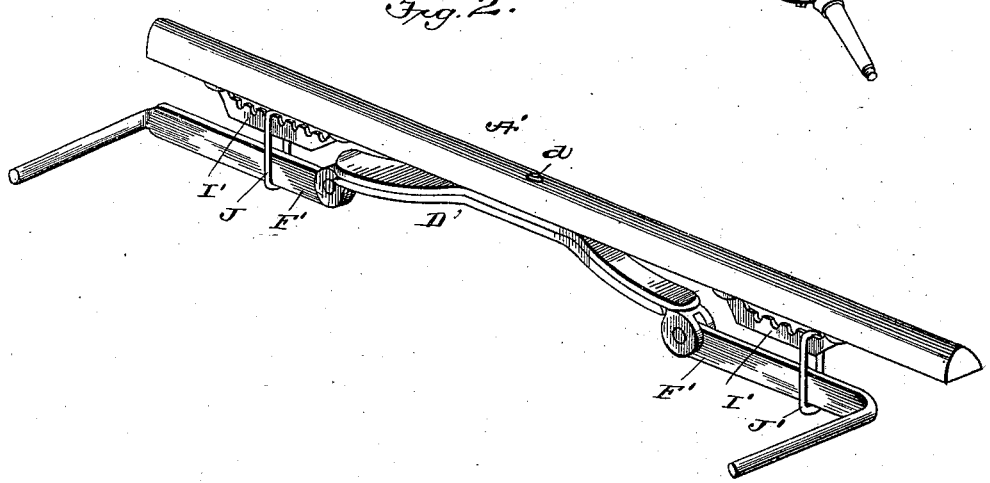

In the accompanying drawings which show the preferable way of carrying out my invention—Figure 1 shows a perspective view of my improvement attached to a two-wheeled vehicle. Fig. 2 is a similar view of a modification.

Referring now to the details of the drawings by letters, A represents the thills of the vehicle to which is pivoted at $b$ one end of the curved body B, and on the upper end of which is connected the seat C. These parts are of the ordinary construction and therefore need no further description.

D represents a spring connected at one end to the thills A by bolts and nuts as shown at $d$. To the other end of this spring is pivoted at $d'$ a lever or bar F and this bar is provided with a hooked end $f$ which is connected to the body B in any suitable way, but I prefer the way shown in the drawings which consists of a link G having an eye $g$ at one end, which is slipped over the hooked end $f$ and its other end is connected to a cross-bar H, which extends from side to side of the vehicle and is connected to the curved body B.

It will of course be understood that all the parts above described with the exception of the seat and body are in duplicate, and as they are the same on each side of the vehicle only one set is described.

I attach a bar I to the thills at $i\ i$, and make a series of notches $i'$ in this bar in which fits a link J which connects the lever F with said bar I. These notches are formed so that the link J may be moved either forward or backward, thereby changing the fulcrum of said lever in order to suit the amount of load carried.

In the modification shown in Fig. 2, the principal parts are essentially the same as in Fig. 1, and are connected as follows: A' represents a bar to which the spring D' is bolted at $d$. On each end of the bar I, I secure the notched bars I'. Connected at each end of the spring D' is a lever F' and these levers support the body of the vehicle. J' J' are links connecting the bars I and the levers F' and fit in the notches in said bars, and are for the same purpose as the links J in Fig. 1.

The device above described is sufficiently simple, it is thought, to need no description of its operation; but it may be stated that when a light load is used the links are placed in the notches nearest the springs and when a heavier load is carried the links are moved farther away from said springs, thus changing the position of the fulcrum, and therefore practically giving the same effect as though a stronger spring were placed on the vehicle.

From the above description and the accompanying drawings, it will be seen that I have produced a spring support for a vehicle that is so simple that it cannot easily get out of order and one that may, with very little modification, be used on either a two or four wheeled vehicle.

What I claim as new is—

1. The combination with the body and springs of a vehicle, of a lever having one end connected to said spring and its other end connected to said body, a notched bar connected to the vehicle and arranged above the lever, and a link connecting said lever with said bar and adapted to fit in any of the notches in the bar, substantially as described.

2. In a vehicle, a spring connected to the thills, a lever having one end connected to said spring and the other end connected to the body of the wagon, a notched bar arranged above the lever and connected to the under side of the thills, in combination with a link connecting said bar and lever and adapted to fit in any of the notches in the bar, substantially as described.

JAMES A. LUKE.

Witnesses:
J. A. WEBSTER,
IDA M. SEBURN.